Jan. 20, 1959 P. J. H. JANSSEN 2,870,251
CIRCUIT ARRANGEMENT FOR USE IN TELEVISION RECEIVERS
Filed Sept. 30, 1955
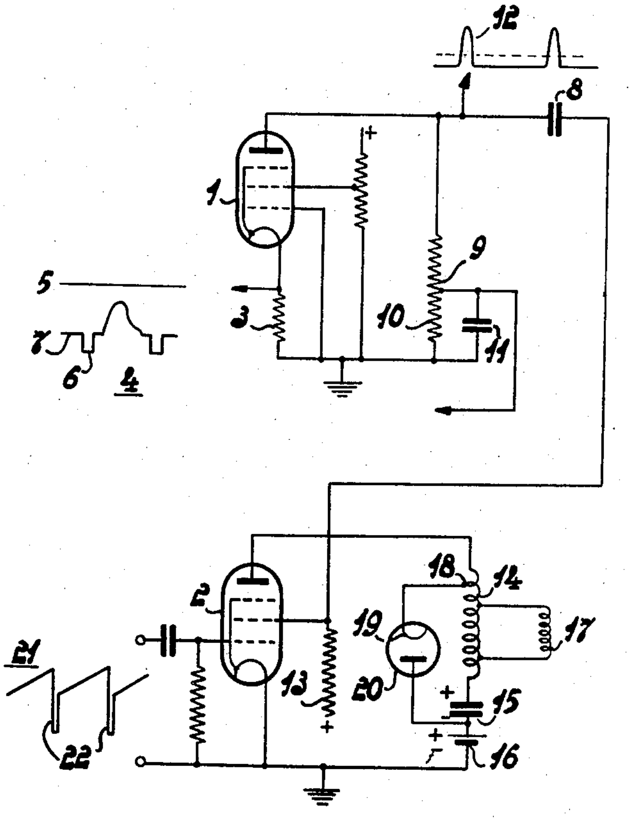
INVENTOR
PETER JOHANNES HUBERTUS JANSSEN
BY Fred M. Vogel
AGENT // United States Patent Office
2,870,251
Patented Jan. 20, 1959

2,870,251

CIRCUIT ARRANGEMENT FOR USE IN TELEVISION RECEIVERS

Peter Johannes Hubertus Janssen, Eindhoven, Netherlands, assignor, by mesne assignments, to North American Philips Company, Inc., New York, N. Y., a corporation of Delaware

Application September 30, 1955, Serial No. 537,866

Claims priority, application Netherlands October 8, 1954

2 Claims. (Cl. 178—7.5)

The invention relates to a circuit arrangement for use in a television receiver for the production of a control voltage for automatic gain control, in which circuit arrangement reference levels included in the video signal at line frequency are supplied with releasing polarity to a control electrode of a first tube so that this first tube can be conductive only during the occurrence of said reference levels, and the anode of the first tube has positive voltage pulses supplied to it which are derived from the line deflection circuit of the receiver, which circuit comprises a second tube of the kind comprising a screen grid, to the anode circuit of which second tube the line deflector coils are coupled via a transformer and in which circuit the anode direct voltage of the second tube is partly supplied by a capacitor included in the anode circuit of the second tube, which capacitor is charged via a series damping diode circuit, the cathode of said diode being heated indirectly.

In such circuit arrangements the positive voltage pulses have so far usually been derived from a winding of the transformer of the line deflection circuit. However, this arrangement has the following limitation. When the television receiver is switched on, the warming-up time of the cathode of said diode exceeds the warming-up time of the cathodes of the remaining tubes of the receiver. Consequently it is some time before a line saw tooth current flows through the transformer of the line deflection circuit, whereas the other tubes have already become operative. Since the positive voltage pulses are lacking, no anode voltage is applied to the first-mentioned tube with the result that no control voltage for automatic gain control is produced. Thus, the high-frequency and intermediate-frequency amplifier tubes have no negative control-grid bias voltage supplied to them so that initially the high-frequency and intermediate-frequency gain has a maximum value. This is particularly inconvenient in the sound channel of the receiver.

The circuit arrangement in accordance with the invention obviates this limitation and is characterized in that the positive voltage pulses which are supplied to the anode of the first tube are derived from a non-decoupled resistance which is included in the screen grid circuit of the second tube.

An embodiment of the circuit arrangement in accordance with the invention will now be described with reference, by way of example, to the accompanying drawing.

In the circuit arrangement shown a video signal shaped into the form shown at 4 is set up across a cathode resistor 3 of a first tube 1. This cathode resistor 3 may, for example, be connected in the cathode circuit of the preceding video amplifier tube, however, the signal 4 may be obtained in any other known manner which is not of importance for an understanding of the invention. It is only important that in the case shown the amplitude of the video signal varies from a fixed level 5 in negative sense. Thus, with increasing amplitude the level of the peaks of the synchronizing pulses 6 is reduced. For the sake of simplicity this level 6 will be considered as the reference level, although the black level 7 may also be used as a reference level.

The control grid of the tube 1 is connected to earth. In a manner which will be described more fully hereinafter positive voltage pulses are supplied to the anode of the tube 1 via a capacitor 8 and a resistor 9, which pulses occur simultaneously with the synchronizing pulses 6. Thus, the tube 1 will be conductive only during the occurrence of the synchronizing pulses 6. When the amplitude of the video signal 4 increases, a larger anode current will flow in the tube 1 and through the resistor 9 so that the voltage produced across a part 10 of the resistor 9 becomes more negative. A capacitor 11 is connected in parallel with the resistor 10. From this parallel connection 10, 11 the control-voltage for automatic gain control may be derived in a manner known per se. The positive voltage-pulses 12 which are supplied to the anode of the tube 1 through the capacitor 8 are derived from a non-decoupled resistor 13 which is included in the screen grid circuit of the second tube 2. This tube 2 forms part of the line deflection circuit. For this purpose the anode circuit of the tube 2 included the series combination of the primary winding of an autotransformer 14, a capacitor 15 and the anode supply source 16. Deflector coils 17 are connected to a tapping on the winding 14. A tapping 18 on the winding 14 is connected to the cathode 19 of a series damping diode 20 the anode of which is connected to the positive terminal of the anode supply source 16. The control grid circuit of the tube 2 has a voltage 21 supplied to it which periodically contains negative going pulses 22 so that the tube 2 is cut off periodically. Between these pulses the voltage 21 frequently has a sawtooth variation.

The operation of this line sawtooth circuit arrangement is known per se. For an understanding of the present invention it should be noted that no direct current can flow through the series combination of the coil 14, the capacitor 15 and the anode supply source 16. The anode direct current of the tube 2 is only allowed to flow when the diode 20 is conductive. Although in this circuit arrangement, as is wellknown, a high potential is periodically applied to the cathode 19 of the diode during the fly-back of the sawtooth current through the coil 14, use is sometimes made of an indirectly heated cathode which is heated by means of heat conduction from the filament. However, in such a construction a high potential difference is produced between the filament and the cathode so that the interposed heat-conducting material must be able to withstand this potential difference. As a result the cathode takes longer to warm up. As an alternative, a cathode is frequently used which is heated by radiation from the filament. However, after the receiver has been switched on, in this event also it takes a comparatively long period of time until the cathode has attained the required temperature by means of radiation from the filament. During this prolonged warming-up period the diode 20 is not conductive and no anode supply voltage is fed to the tube 2 so that no sawtooth current flows through the coil 14. If, now, the voltage pulses 12 should be derived from the coil 14, they would be lacking during this warming-up period so that no negative control voltage would be set up across the parallel combination 10, 11.

However, the screen grid of the tube 2 has a direct voltage applied to it so that screen grid current can flow in the tube 2 before termination of the warming-up period of the cathode 19 of the diode 20. This screen grid current is periodically interrupted due to the occurrence of negative pulses 22 at the control electrode of the tube 2. As a result across the screen grid resistor 13 a pulsatory voltage shaped in the form shown at 12 is set up, which voltage is suited to be supplied to the anode of the tube 1.

What is claimed is:

1. An automatic gain control circuit for use in a television receiver, comprising a source of video signals having a recurrent reference-voltage level, a first electron tube having a control electrode and an output electrode, means connected to bias said tube normally beyond its cut-off point, means connected to apply said video signals to said control electrode with a polarity tending to render said tube conductive, a deflection circuit comprising a second tube having a control electrode, a screen grid and an output electrode, a source of a deflection signal connected to said last-named control electrode, said deflection signal containing recurrent pulses substantially in synchronism with said recurrent reference voltage level, a deflection output circuit coupled to said output electrode, a source of operating voltage for said screen grid, a resistor connected between said source of voltage and said screen grid, said screen grid being unbypassed so that the current flow in said second tube causes recurrent pulses to occur at said screen grid substantially in synchronism with said recurrent reference-voltage level, means connected to apply said last-named pulses to the output electrode of said first tube with a polarity and amplitude so that said first tube can become conductive only during the occurrences of said last-named pulses, and means connected to derive an automatic gain control voltage from the current flow in said first tube.

2. An automatic gain control circuit for use in a television receiver, comprising a source of video signals having a recurrent reference-voltage level, a first electron tube having a control electrode and an output electrode, means connected to bias said tube normally beyond its cut-off point, means connected to apply said video signals to said control electrode with a polarity tending to render said tube conductive, a deflection circuit comprising a second tube having a control electrode, a screen grid and an output electrode, a source of a deflection signal connected to said last-named control electrode, said deflection signal containing recurrent pulses substantially in synchronism with said recurrent reference voltage level, a deflection output circuit comprising a deflection coil, a transformer connected between said deflection coil and the last-named output electrode and having a winding connected at an end thereof to said last-named output electrode, a source of operating potential for said last-named output electrode, a capacitor connected between said source of operating potential and the remaining end of said winding, and a diode connected between a point on said winding and the junction of said capacitor and source of operating potential and polarized to favor current flow from said source to said last-named output electrode and having an indirectly heated cathode, a source of operating voltage for said screen grid, a resistor connected between said screen grid and the last-named source of voltage, said screen grid being unbypassed so that the current flow in said second tube causes recurrent pulses to occur at said screen grid substantially in synchronism with said recurrent reference-voltage level, means connected to apply said last-named pulses to the output electrode of said first tube with a polarity and amplitude so that said first tube can be conductive only during the occurrences of said last-named pulses, and means connected to derive an automatic gain control voltage from the current flow in said first tube.

References Cited in the file of this patent

UNITED STATES PATENTS 2,289,291 Moore ---------------- July 7, 1942